US010997754B2

(12) United States Patent
Asente et al.

(10) Patent No.: US 10,997,754 B2
(45) Date of Patent: May 4, 2021

(54) FREEFORM DRAWING BEAUTIFICATION

(71) Applicant: Adobe Inc., San Jose, CA (US)

(72) Inventors: Paul J. Asente, Redwood City, CA (US); Jakub Fiser, Prague (CZ)

(73) Assignee: Adobe Inc., San Jose, CA (US)

(*) Notice: Subject to any disclaimer, the term of this patent is extended or adjusted under 35 U.S.C. 154(b) by 462 days.

(21) Appl. No.: 14/723,059

(22) Filed: May 27, 2015

(65) Prior Publication Data

US 2016/0351170 A1 Dec. 1, 2016

(51) Int. Cl.
*G06T 15/40* (2011.01)
*G06T 11/20* (2006.01)
*G06F 3/0484* (2013.01)
*G06F 3/0488* (2013.01)

(52) U.S. Cl.
CPC ........ *G06T 11/203* (2013.01); *G06F 3/04845* (2013.01); *G06F 3/04883* (2013.01)

(58) Field of Classification Search
CPC ..... G06T 11/203; G06T 11/206; G06T 17/30; G06F 17/17; G09G 5/20
USPC ......................................................... 345/442
See application file for complete search history.

(56) References Cited

U.S. PATENT DOCUMENTS 6,459,442 B1* 10/2002 Edwards ............. G06F 3/04883
715/700
2006/0227140 A1* 10/2006 Ramani ............... G06K 9/00416
345/441
2011/0038543 A1* 2/2011 Bhattacharyya ... G06K 9/00422
382/187
2011/0164041 A1* 7/2011 Miura ................... G06T 11/203
345/442

OTHER PUBLICATIONS

"Freeform User Interfaces for Graphical Computing" (A doctoral dissertation, Graduate School of Information Engineering, The University of Tokyo, Dec. 1999, by Takeo Igarashi).*
Igarashi,"Pegasus: A Drawing System for Rapid Geometric Design", In Proceedings: CHI'98 Conference Summary on Human Factors in Computing Systems, 1998, 2 pages.
Igarashi,"Interactiye Beautification: A Technique for Rapid Geometric Design", UIST, Proceedings of the 10th annual ACM symposium on User Interface Software and Technology, 1997, 10 pages.
Murugappan,"Towards Beautification of Freehand Sketches using Suggestions", In Proceedings: The 6th EUROGRAPHICS Workshop on Sketch-Based Interfaces and Modeling, 2009, 8 pages.

* cited by examiner

*Primary Examiner* — Gordon G Liu

(74) *Attorney, Agent, or Firm* — FIG. 1 Patents

(57) ABSTRACT

Freeform drawing beautification techniques are described. An input is received by a computing device describing a freeform path drawn by a user as part of a drawing, the freeform path not formed solely as a circular arc or a circle (e.g., a fixed distance from a point) and including one or more curved elements. The drawing is examined by the computing device to locate another curved element in the drawing. One or more suggestions are constructed to adjust the freeform path by the computing device based on the located curved element in the drawing. The constructed one or more suggestions are output to adjust the freeform path by the computing device.

20 Claims, 17 Drawing Sheets

FREEFORM DRAWING BEAUTIFICATION

BACKGROUND

Freeform drawings are one of the quickest ways for a user to create content to graphically represent an image, idea or principle, because a user is free to provide an input without constraint. Freeform drawings are also referred to freehand drawing, sketching, and so on and are generally unconstrained inputs specified using freeform paths in a manner that mimics a user's ability to draw on a piece of paper using a pen or pencil. In computing devices, a user may define the freeform paths that is detected using touchscreen functionality of a display device (e.g., as a gesture, through use of a stylus), use of a cursor control device, and so on.

Although a user may quickly input these freeform paths to compose a drawing, the freeform paths are typically informal and thus not intended as a finished work. Conventional techniques have been developed to increase precision and look-and-feel of these freeform drawings, however these conventional techniques typically require detailed knowledge on the part of a user are involve a significant amount of time to perform.

SUMMARY

Freeform drawing beautification techniques are described. An input is received by a computing device describing a freeform path drawn by a user as part of a drawing, the freeform path not formed solely as a circular arc or a circle (e.g., a fixed distance from a point) and including one or more curved elements. The drawing is examined by the computing device to locate another curved element in the drawing. One or more suggestions are constructed to adjust the freeform path by the computing device based on the located curved element in the drawing. The constructed one or more suggestions are output to adjust the freeform path by the computing device.

In one or more implementations, an input is received by a computing device describing the freeform path drawn by a user as part of a drawing. The drawing is examined by the computing device to locate other paths that already exist in the drawing. A likelihood is evaluated that the freeform path conforms individually to respective ones of a plurality of geometric rules, one or more of which consider the other paths that already exist in the drawing such that the evaluating performed by at least one said geometric rule causes output of a modification of the freeform path and a score representing a likelihood that the modification is correct. One or more suggestions are constructed to adjust the freeform path by the computing device based on the score generated by the rules and the constructed suggestions are output to adjust the freeform path by the computing device.

In one or more implementations, a system includes a freeform drawing module implemented at least partially in hardware, the freeform drawing module configured to receive an input describing a freeform path drawn by a user as part of a drawing. The freeform path may include one or more curved elements. The system also includes a beautification assistant module implemented at least partially in hardware. The beautification assistant module is configured to construct one or more suggestions to adjust the freeform path based on geometric principles such as straightness, circularity, parallelism, congruence, transformation, and curve offset, possible relative to paths previously included in the drawing.

A computing device includes one or more modules implemented at least partially in hardware. The one or more modules are configured to perform operations including receiving an input by the computing device describing a freeform path drawn by a user as part of a drawing and constructing one or more suggestions by the computing device to adjust the freeform path based on curve similarity or as a curve offset in reference to at least one located curved elements previously included in the drawing.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
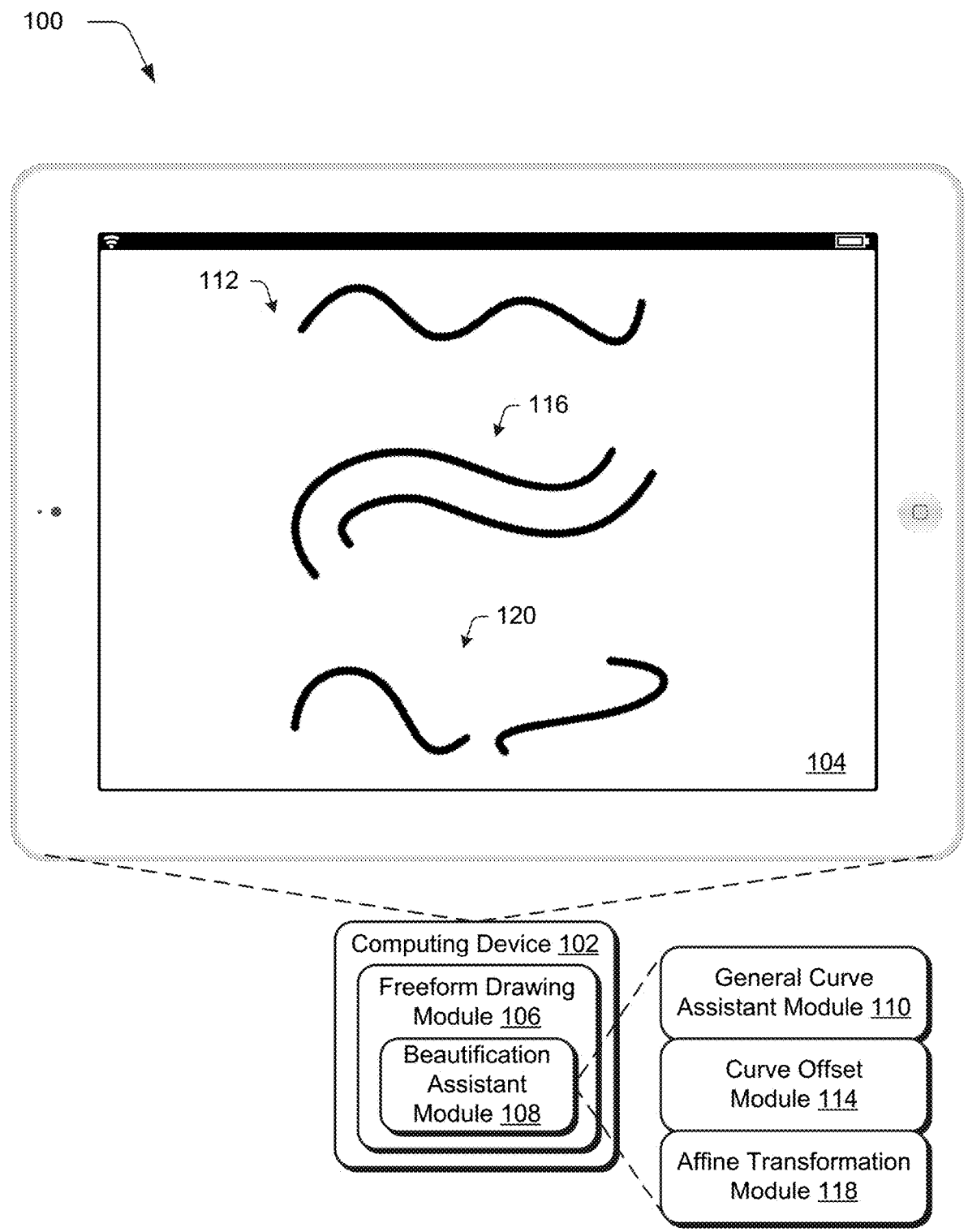
FIG. 1 is an illustration of an environment in an example implementation that is operable to employ freeform drawing beautification techniques described herein.

Freeform drawings such as sketching are one of the simplest ways to visualize ideas. One key advantage is that the user is not required to have specialized knowledge of particular drawing software nor any advanced drawing skills. In practice, however, these skills may become necessary to improve the visual fidelity of the resulting drawing. Conventional techniques used to make the freeform input look more precise and polished, however, require the user to have experience with drawing software. Even if the user has this experience, use of conventional drawing software could take even longer to perform than making the freeform input itself.

Freeform drawing beautification techniques are described that are used to bridge the gap between imprecise sketches and complicated use of conventional drawing software. These techniques convert an imprecise freeform input to a precise output by exploiting rules that are able to ascertain a likely intent of a user that provided the freeform input. The rules, for instance, are usable to construct suggestions that are straightened or made into arcs, or are perpendicular, parallel, offset, translated, scaled, or rotated to other paths already drawn by a user, if present. Considerations may also be made for document zoom level, distance from existing art (e.g., closer art influences the suggestions more than distance art), age of the art (e.g., recently drawn art influences suggestions more than older art), and so forth.

For example, suggestions may be made by a computing device for a newly created path by comparing it to existing paths. The set of suggestions takes into account parallelism, perpendicularity, coordinate snapping, path length, axis alignment, line reflection, circularity, curve offset, smooth curve tangents, and similarity to other paths.

To determine curve offset suggestions, a distance from a new path to existing paths is determined and situations are found where the distance is relatively constant. If the distance is relatively constant, a new path is suggested that is evenly offset.

A variety of techniques may be used to determine curve similarity. For example, an examined curve may be scaled and aligned in a way that the endpoints match the endpoints of an existing path. A distance metric is used to scale a length of the existing path, thus giving a scale independent distance. If the relative distance is sufficiently small, the examined curve is replaced with a scaled, rotated, and/or translated copy of the existing curve.

Additionally, zoom level may be considered using screen space for all distances, thereby making the suggestions scale independent. A variety of other examples are also contemplated, further discussion of which is contained in the following sections.

Techniques are also described to control adjustments made to the freeform path based on geometric rules. For example, a directed graph may be formed by a computing device by treating each of a plurality of geometric rules as an extensible set of self-contained geometric rules, each built as a black box and independent of other rules. Examples of geometric rules include endpoint snapping, end tangent alignment, line parallelism, line perpendicularity, line length equality, arc center snapping, curve offset, curve identify, curve rotation, or curve reflection. The geometric rules may be chained in the directed graph to support complex modifications of the input freeform path through successive application of the geometric rules to arrive at modifications and scores for those modifications by "walking" the directed graph using scores indicating a likelihood that a corresponding modification is correct to arrive at a final adjustment, further discussion of which is included in relation to FIGS. 3, 4, and 16.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ freeform drawing beautification techniques described herein. The illustrated environment 100 includes a computing device 102 having a display device 104, on which, a user interface may be displayed to support user interaction.

The computing device 102 may be configured in a variety of ways. The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 17.

The computing device 102 is illustrated as including a freeform drawing module 106. The freeform drawing module 106 is representative of functionality of the computing device 102 to accept and process user inputs to form freeform drawings for display by the display device 104. A user, for example, may provide inputs using a cursor control device, gesture, stylus, and so on to define a freeform drawing for output. The freeform drawing module 106 is also illustrated as including a beautification assistant module 108 that is representative of functionality to automatically rectify a freeform drawing input by a user in a manner that maintains simplicity and speed of freeform sketching while still taking into account implicit geometric relations.

Examples of functionality of the beautification assistant module 108 are illustrated as a general curve assistant module 110 to support rectification of freeform drawings having general curves 112 (e.g., supports poly-curves composed of general cubic Bezier curves in addition to simple line segments and arcs), a curve offset module 114 to support freeform drawing of curve offsets 116, and an affine transformation module 118 that supports freeform drawings having affine transformations 120, e.g., by applying a linear combination of translation, rotation, scaling, reflection, and/or shearing. Other examples are also contemplated as further described in the following.

Figure 2:
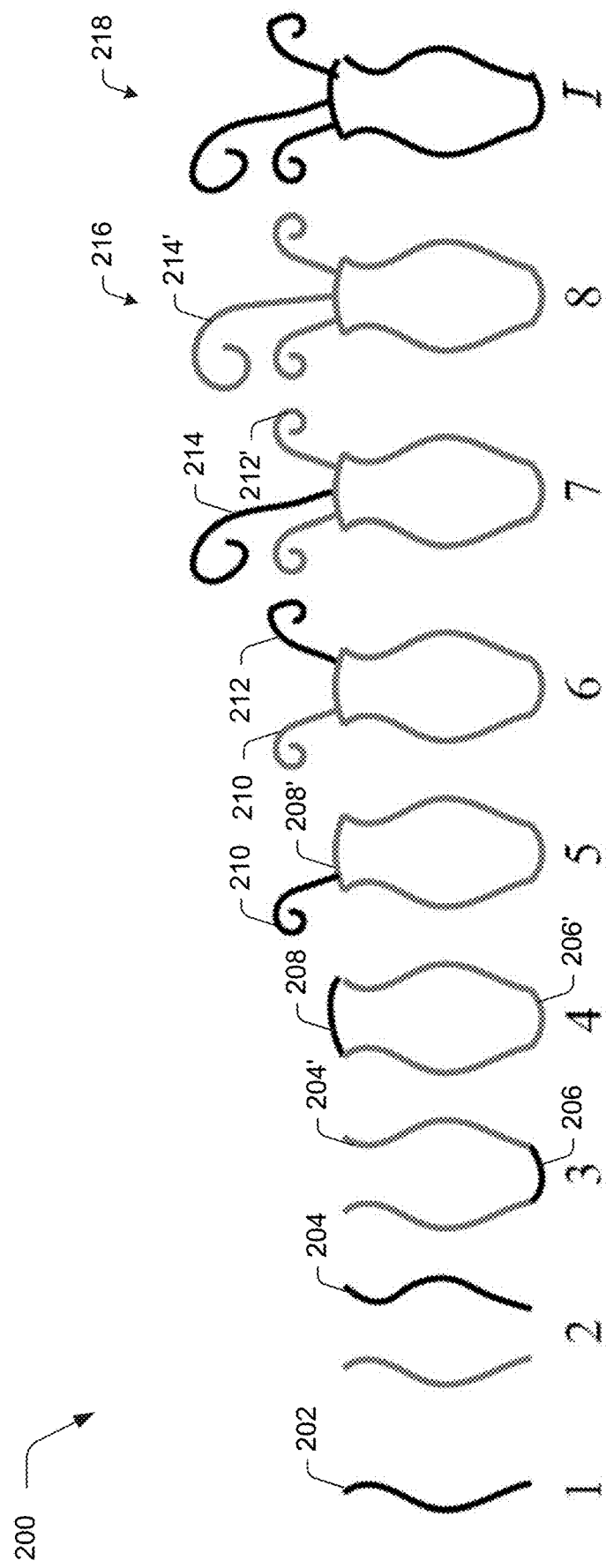
FIG. 2 depicts an example of a beautification workflow of a beautification assistant module of FIG. 1.

FIG. 2 depicts an example 200 of a beautification workflow of the beautification assistant module 108 of FIG. 1. Incremental beatification is performed by the beautification assistant module 108 is shown as successive input lines 202-214 and adjusted lines 204'-214' through stages 1-7 to arrive at a beautification result 216, as contrasted with drawn collection 218 of input lines 202-214.

For example, a user initially draws input line 202, which remains as is because there are no other lines that serve as a basis for adjustment. Input line 204 is then drawn, which is adjusted by the beautification assistant module 108 to form adjusted line 204' to form a mirror image of input line 202 through a process referred to as reflection. Input line 206 is then drawn by a user, which is then adjusted by the beautification assistant module 108 to have a symmetric curve as shown for adjusted line 206' through arc fitting. Similarly, input line 208 is drawn by a user and adjusted by the beautification assistant module 108 to have a symmetric curve as shown for adjusted line 208'.

An input line 210 is then drawn to represent a plant leaf, which is sufficiently different from other lines and as such as not adjusted. Curve identity, reflection, and scaling are then used to adjust subsequent input lines 212, 214 to form adjusted lines 212', 214' that are based at least in part on adjusted line 210' and as such mimic characteristics of the plant leaf.

Thus, as the freeform drawing continues, more suitable geometric constraints emerge and are applied by the beautification assistant module 108 as suggestions, such as curve identity (e.g., stages 2, 6, 7), reflection (e.g., stages 2 and 6) and arc fitting (stages 3,4). Thus, as is readily apparent through comparison with the input 218 and final output freeform art at the result 216 the beautification assistant module 108 supports efficient freeform drawing with results that are ready for sharing with others.

Figure 3:
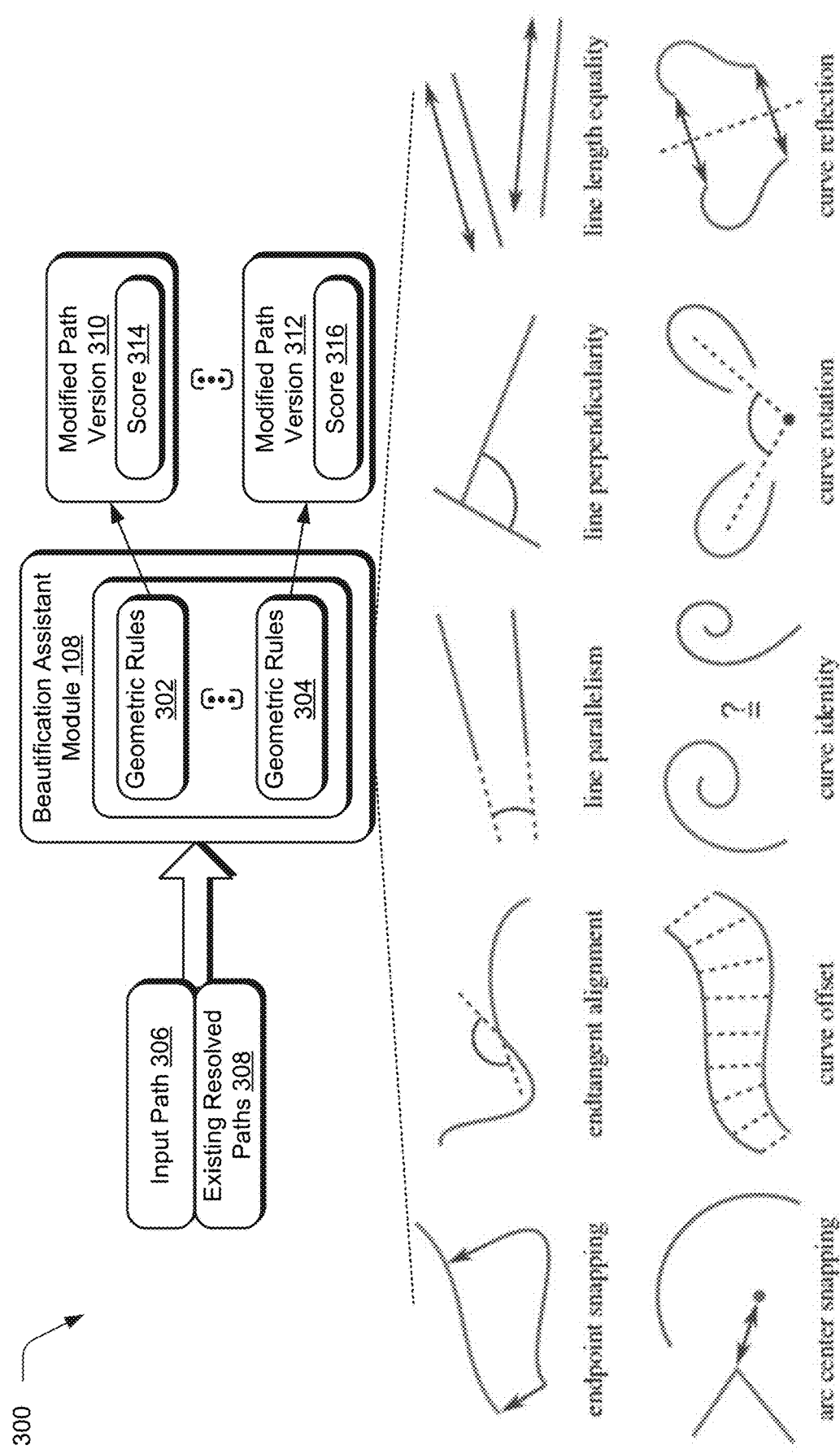
FIG. 3 depicts an implementation showing examples of geometric rules that are supported by the beautification assistant module of FIG. 1.

FIG. 3 depicts an implementation 300 showing examples 300 of geometric rules 302, 304 that are supported by the beautification assistant module 108 to perform beautification. The examples include endpoint snapping, end tangent alignment, line parallelism, line perpendicularity, line length equality, arc center snapping, curve offset, curve identify, curve rotation, and curve reflection.

The beautification assistant module 108 treats each of these geometric rules 302, 304 as an extensible set of self-contained geometric rules, each built as a black box and independent of other rules. Each of the geometric rules 302, 304 represents a single geometric property, such as having an endpoint snapped or as being a reflected version of an existing path.

The input to each rule is an input path 306 including an end-to-end connected series of Bezier curves, and a set of existing resolved paths 308. The beautification assistant module 108, operating as a black box, evaluates the likelihood that the path conforms to the geometric property, considering the resolved paths. The beautification assistant module 108 then outputs zero or more modified path versions 310, 312. Each modified path version 310, 312 has a corresponding score 314, 316 representing a likelihood that the modification is correct. For example, a same-line-length rule would, for input that is a line segment, create output versions that are the same lengths as existing line segments, along with scores that indicate how close the segment's initial length was to the modified length. Thus, the scores may reflect an amount of adjustment performed by respective rules to achieve a respective suggestion.

Each geometric rule 302, 304 also has some threshold that determines that the score for a modification is too low, and in that case it does not output the path. The geometric rules 302, 304 also mark properties of the path that have become fixed and therefore can no longer be modified by future rules. For example, the endpoint-snapping rule marks one or both endpoint coordinates of a path as fixed. The same-line-length and parallel-line rules do not attempt to modify a segment with two fixed endpoints. Since the geometric rules 302, 304 do not depend on each other, new geometric rules may be readily added to support additional geometric traits.

Figure 4:
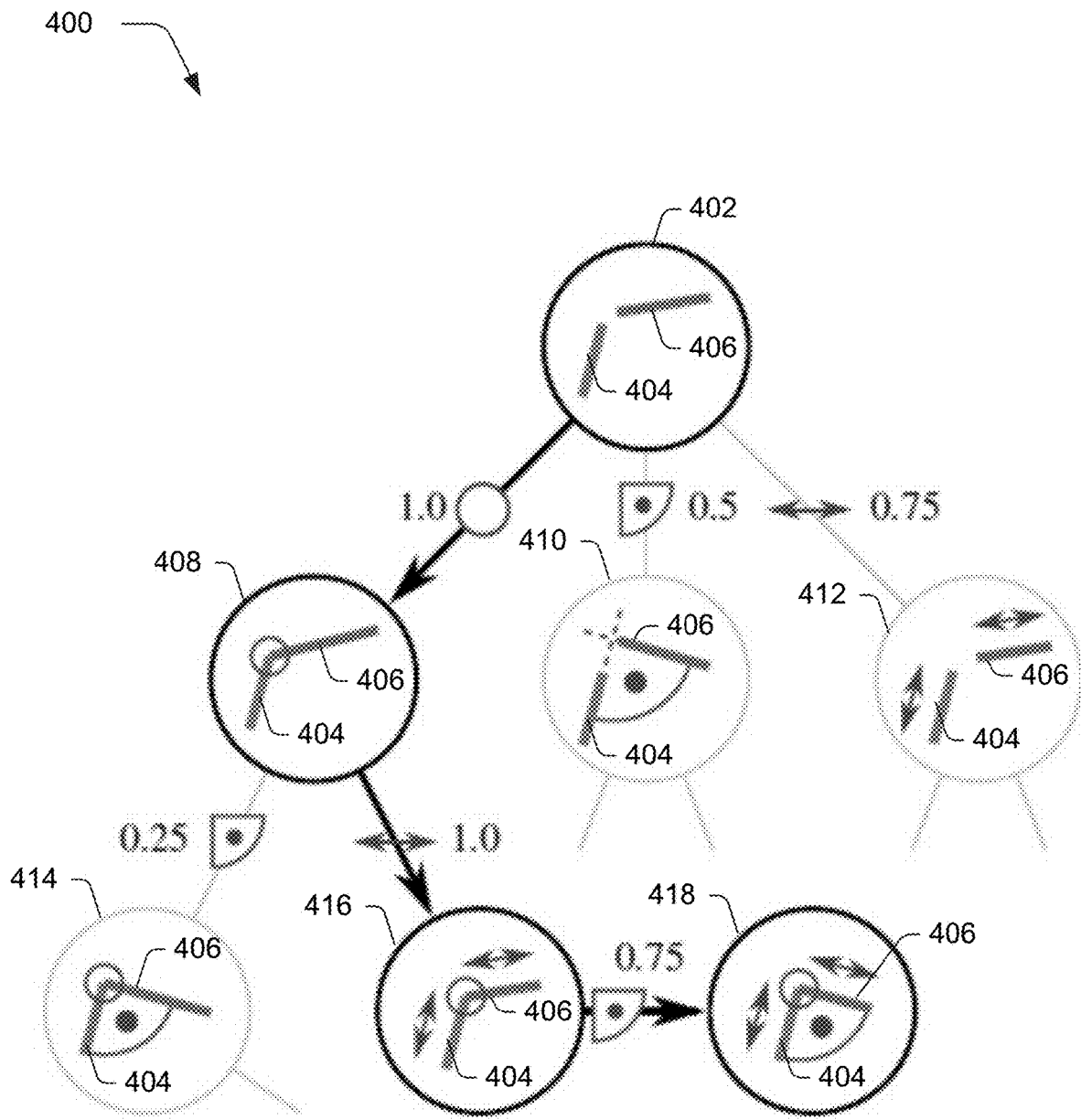
FIG. 4 depicts an example implementation of successive rule evaluation and application performed by the beautification assistant module of FIG. 1.

FIG. 4 depicts an example implementation 400 of successive rule evaluation and application performed by the beautification assistant module 108. Chaining geometric rules can lead to complex modifications of the input freeform path. Geometric rule application is treated by the beautification assistant module 108 as branching in a directed rooted tree of paths, where a root node 402 corresponds to the unmodified input path. Each branch of the tree corresponds to a unique application of one rule and the branch is given a weight corresponding to the rules score. Therefore, to find a suitable transformations to a user input, the beautification assistant module 108 traverses down a tree as illustrated in FIG. 4.

In this example, the beautification assistant module 108 evaluates three geometric rules, endpoint snapping, perpendicularity, and length equality. An existing path 404 is fixed and a new path 406 is added, the combination of which becomes a root node 402 of an evaluation graph and the expansion begins by testing each of the rules on it. For child node 408, for instance, an endpoint snapping geometric rule is applied, for child node 410 a perpendicularity geometric rule is applied, and for child node 412 a length equality geometric rule is applied.

A likelihood score is calculated for each rule application, examples of which are illustrated as "1.0," "0.5," and "0.75," respectively. The tree is expanded using a best-first search scheme, until leaf nodes are reached. An example of this is addition of grandchild nodes 414, 416 from child node 408 due to application of perpendicularity and length equality geometric rules, respectively. Great-grandchild node 418 is then formed through application of the perpendicularity rule to grandchild node 416. Thus, each branch of the tree corresponds to a unique ordered application of rules and the branch is given a weight corresponding to the rules scores of the branch. Therefore, to find a suitable transformations to a user input, the beautification assistant module 108 traverses down the tree and bases an adjustment on the corresponding scores.

Due to significant redundancy in the search space, leaf nodes may contain duplicate suggestions. Therefore, the beautification assistant module 108 is configured to prune the graph during the expansion step using information from nodes that were already reached, which is described in further detail in the following.

Formally, assume a node "n" with Bezier path "p'", the set of resolved paths "S," and the set of all rules "$r_j \in R$", an output set "$Pi = \{r_j(p^i, S)\}$." A child node "$n'_j$" is created for each "$p'_j \in \{r_j(p^i, S)\}$". If "$P^i$" is empty, "n'" is a leaf node. As previously described, each rule outputs a likelihood score for the transformed path. Since a comparison is performed among different rules, the likelihood score is normalized into the interval (0,1). All scores from the nodes visited are used while descending into a particular leaf node "n" to calculate an overall likelihood score for the chained transformation, an example of which follows although it should be readily apparent that other techniques are also usable to compute the score:

$$\mathcal{L}_i = 1 - \prod_{k=1}^{d-1} (1 - \mathcal{L}(r_j(a^k, S))), \quad (1)$$

where "d" is the depth of "n" in the tree, "$a^k$" is the kth ancestor of "n," and $\mathcal{L}(r_j(a^k, S))$ denotes the likelihood score from applying rule "$r_j$" to node $a^k$."

The search tree is expanded in a best-first search manner, where the order of visiting the child nodes is determined by the overall score of the node's path from Equation 1 above. While traversing the tree, a suggested set "Q" of leaf nodes are constructed, which is initially empty and is filled as the leaf nodes are encountered in the traversal. Once not empty, "Q" helps prune the search. Before a particular subtree is expanded, the geometric properties of its root is compared with the properties of each path "q∈Q".

Figure 5:
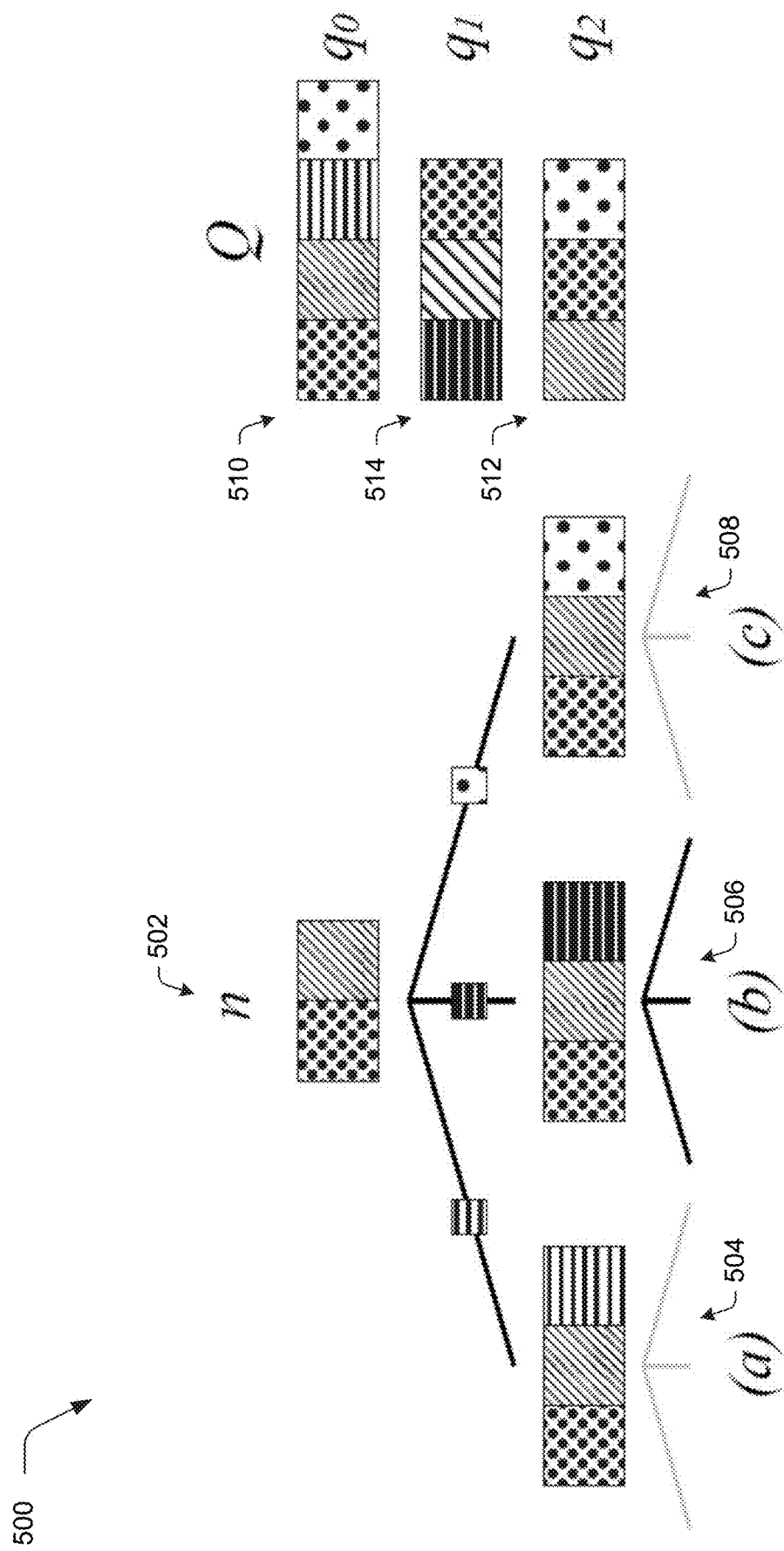
FIG. 5 depicts an example of graph pruning.

If each of the tested properties are found in some path "q," the whole subtree can be omitted from further processing as shown in an example 500 of search graph pruning of FIG. 5. Rules are represented by boxes. An inner node "n" 502 has been expanded into three branches (a,b,c) 504, 506, 508. Before further traversal, each of the subtrees stemming from the child nodes of "n" are tested against suggestions "q∈Q". Here, branches "(a)" 504 and "(c)" 506 are fully contained in "$q_0$" 510 and "$q_2$" 512, respectively, and thus only branch "(b)" 506 is evaluated further.

In one or more implementations, in order to keep a user from being exposed to too many suggestions, a size of "Q" is limited. For example, since the graph is traversed in a best-first manner, the search is stopped after finding some number of unique leaf nodes, e.g., ten.

Example Rules and Operations

Geometric transformations are evaluated by the beautification assistant module 108 by testing various properties of the new path and a set of previously drawn and processed paths. While testing of some properties are relatively simple to perform, others such as path matching involve more complex processing. The rules are first summarized as described in relation to FIG. 3, with additional implementation issues including detailed description of non-trivial rules are described in the following.

Line Detection

The straightness is estimated by measuring a ratio between length of a path and a distance between its endpoints.

Arc Detection

The approximate curvature is computed by calculating angles between tangents of successive path sample. A check is performed to determine whether it is sufficiently uniform and whether the angular span is within an expected range, to prevent treating slightly bent lines or spirals as circular arcs. When the span is close to 2 pi or the path is closed, it is replaced with a full circle.

Endpoint Snapping

A distance between each of the path endpoints and resolved endpoints is examined. Additionally, snapping to inner parts of the resolved paths is also examined. Specialized tests based on the properties of line segments and circular arcs lower the computational complexity of this operation.

End Tangent Alignment

If the path endpoint is snapped, the angle between its tangent and the tangent of the point to which it is attached is measured. If the tangents are sufficiently close, the path is adjusted to make the attachment smooth.

Line Parallelism and Perpendicularity

The angle between two line segment paths is compared with the angle needed to satisfy the parallelism or perpendicularity constraint. The distance is taken between the line segments is also taken into account to slightly increase the priority of nearby paths.

Line Length Equality

The ratio of length of both tested line segments is evaluated. As in the previous case, the mutual distance is incorporated into a final likelihood computation.

Arc and Circle Center Snapping

Similar to endpoint snapping, a distance between the current arc center and potential ones and potential ones are evaluated. In this case endpoints of other paths, other centers, centers of rotations, and centers of regular polygons composed from a series of line segments are evaluated.

Path Identity

To detect that two paths have similar shapes, the paths are aligned and their discrete Frechet distance used. Different scales are also taken into account, further discussion of this is included below in the Path Matching section.

Path Offset

Offset paths generalize line parallelism. To detect these paths, the beautification assistant module 108 progresses along the tested path and measures its distance to the reference path, additional discussion of which is included in the Offset Path Detection section below.

Path Rotational Symmetry

For a tested path "x" and resolved reference "y" path of the "same shape" (as determined by successful application of the path-identity rule), the optimal rotation matrix is found, i.e., center point "c" and angle of rotation "a" that transforms "y" to "y'". Similarly to arc center snapping, an attempt is also made to adjust the position of the rotation center and snap it to some existing point. Since these techniques work in incremental fashion, the angle of rotation is adjusted to the nearest integer quotation of 2 pi, so that additional paths can be placed to form full n-fold rotational symmetry.

Path Reflection Symmetry

Similar to rotational symmetry, an axis is found that minimized the difference between the reflected version of an existing path "y" and the tested path "x." Nearby existing reflection axes are tested, and an attempt is made the found axis parallel with a coordinate axis.

View-Space Distances

Testing paths for different geometric properties involves measuring lengths and distances. While many path attributes may be compared using relative values, absolute values are also necessary, e.g., for snapping endpoints. Using absolute values, however, leads to unexpected behavior when a user interface (e.g., canvas) is zoomed in and out. To eliminate this problem, distances are computed in view-space pixels, making all distance tests magnification-independent.

Path Sampling

Figure 6:
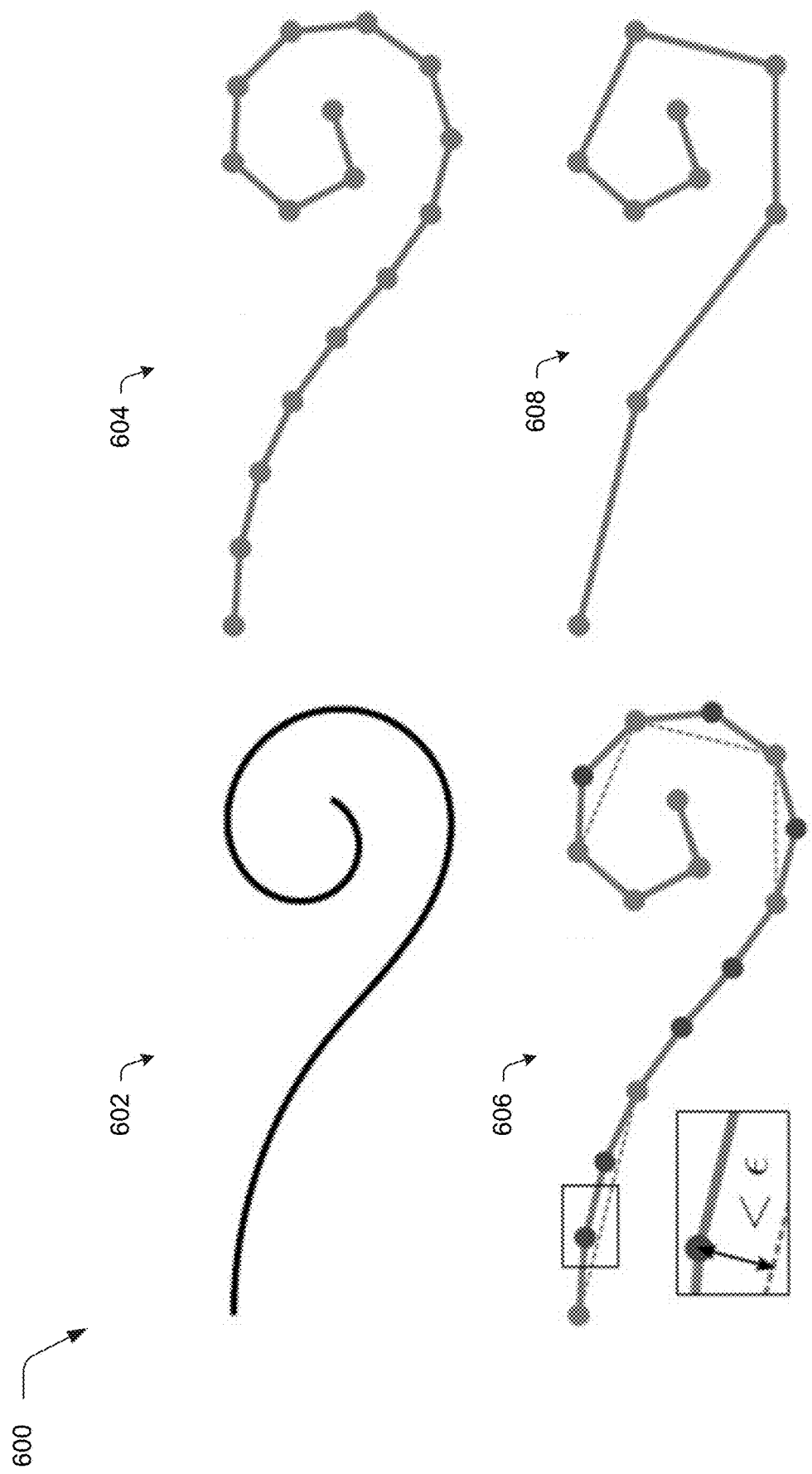
FIG. 6 depicts an example of reduction of memory and computation complexity using path sampling.

Analytical work with cubic Bezier curves is challenging. Some practical tasks, such as finding a path's length or the minimal distance between two paths can only be solved using numerical approaches. Therefore, operations are performed on sampled paths. Since the resolved paths do not change, samples for resolved paths may be precomputed and stored, with sampling limited to new paths. Furthermore, to reduce the memory and computational complexity of different path comparisons, the sampling may be simplified, e.g., using a Ramer-Douglas-Peucker algorithm. For a polyline "p", this finds a reduced version "p'" with fewer points within given tolerance "s", i.e., all points of "p'" lie within the distance "s" of the original path as shown in an example implementation 600 of FIG. 6. In this example, an original Bezier path 602 is equidistantly sampled, giving a polyline 604. The Ramer-Douglas-Peucker algorithm then recursively simplifies the polyline by omitting points closer than "s" to the current approximation as shown at example 606, finally constructing a simplified polyline 608. In an example implementation, "ϵ=4" view space pixels at the time the path was drawn is used.

Path Matching

Path matching involves resolving higher-level geometric relations like path rotational and reflection symmetry. To identify these relations, paths are first classified that are the "same shape," e.g., paths that are different instances of the same "template."

To evaluate the similarity between two sampled paths "$p_a$" and "$p_b$," a similarity measure may be employed, such as a discrete variant of Frechet distances. Formally, it is defined as follows: let (M,d) be a metric space and let the path be defined as a continuous mapping "f:[a,b]→M," where a, b∈ ℝ, a≤b. Given two paths "f:[a,b]→M," and "g:[a¹,b¹]→M", the Frechet distance "$\delta_F$" is defined as:

$$\delta_F(f, g) = \inf_{\alpha,\beta} \max_{t\in[0,1]} d(f(\alpha(t)), g(\beta(t))), \quad (2)$$

where "α" (resp. B) is an arbitrary continuous non-decreasing function from [0,1] onto "[a,b] resp. [a',b']".

Figure 7:
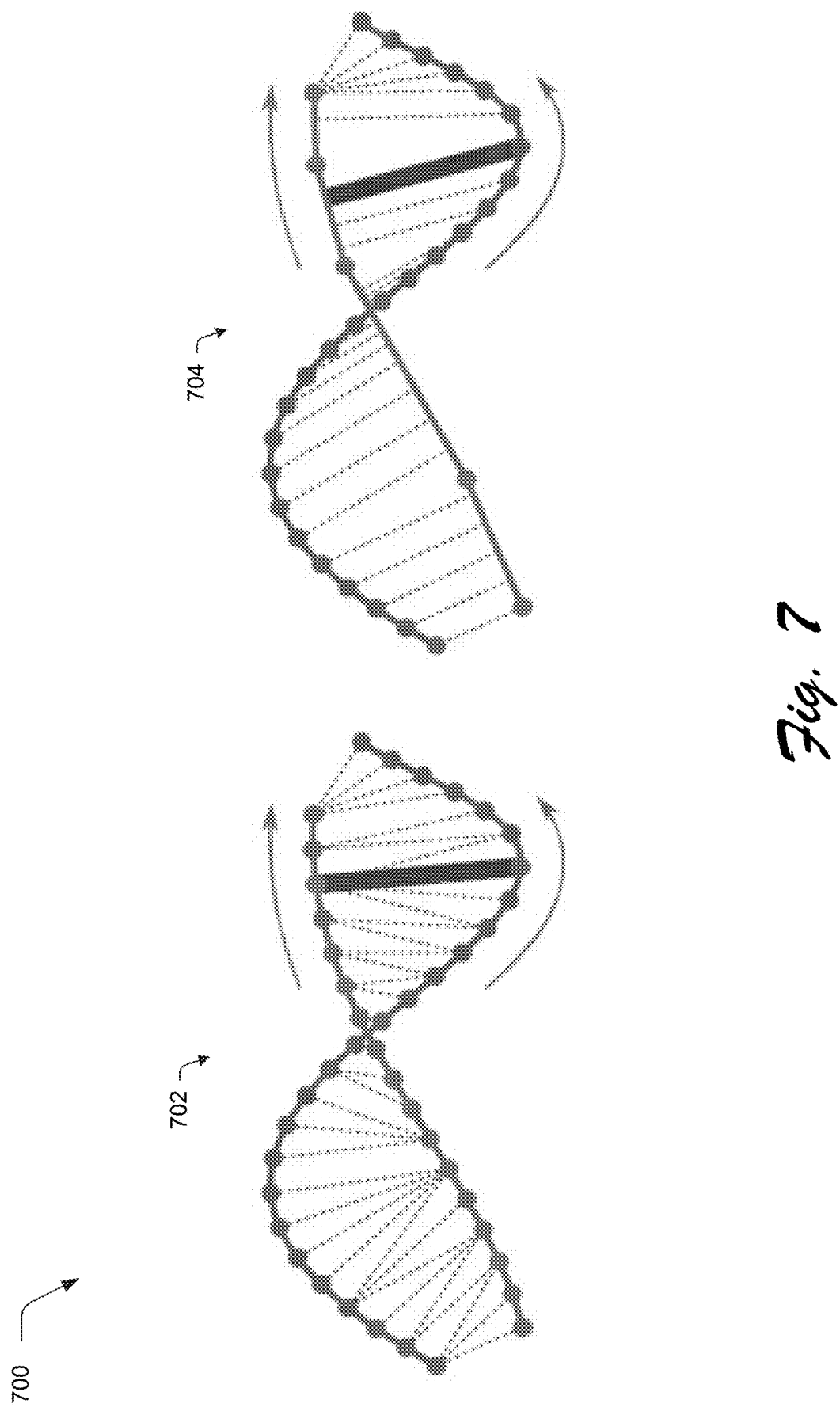
FIG. 7 depicts an example implementation in which a discrete Frechet distance is shown.

FIG. 7 depicts an example implementation 700 in which discrete Frechet distance is shown. The minimum length of the line connecting ordered sets of point samples is shown at 702. Since the resolved paths are stored in the simplified form, the Frechet distance is computed between an ordered set of points and an ordered set of line segment rather than between two point sets as shown at 704.

Intuitively, it is usually described using a leash metaphor: a man walks from the beginning to the end of one path while his dog on a leash walks from the beginning to the end of the other. They can vary their speeds but they cannot walk backwards. The Frechet distance is the length of the shortest leash that can allow them to successfully traverse the paths.

This can be computed for two point sets using a dynamic programming approach. The extension to point and line-segment sets at 704 is then straightforward. However, the measure takes into account the absolute positions of the sample points, while it is the relative distance that is desired.

Figure 8:
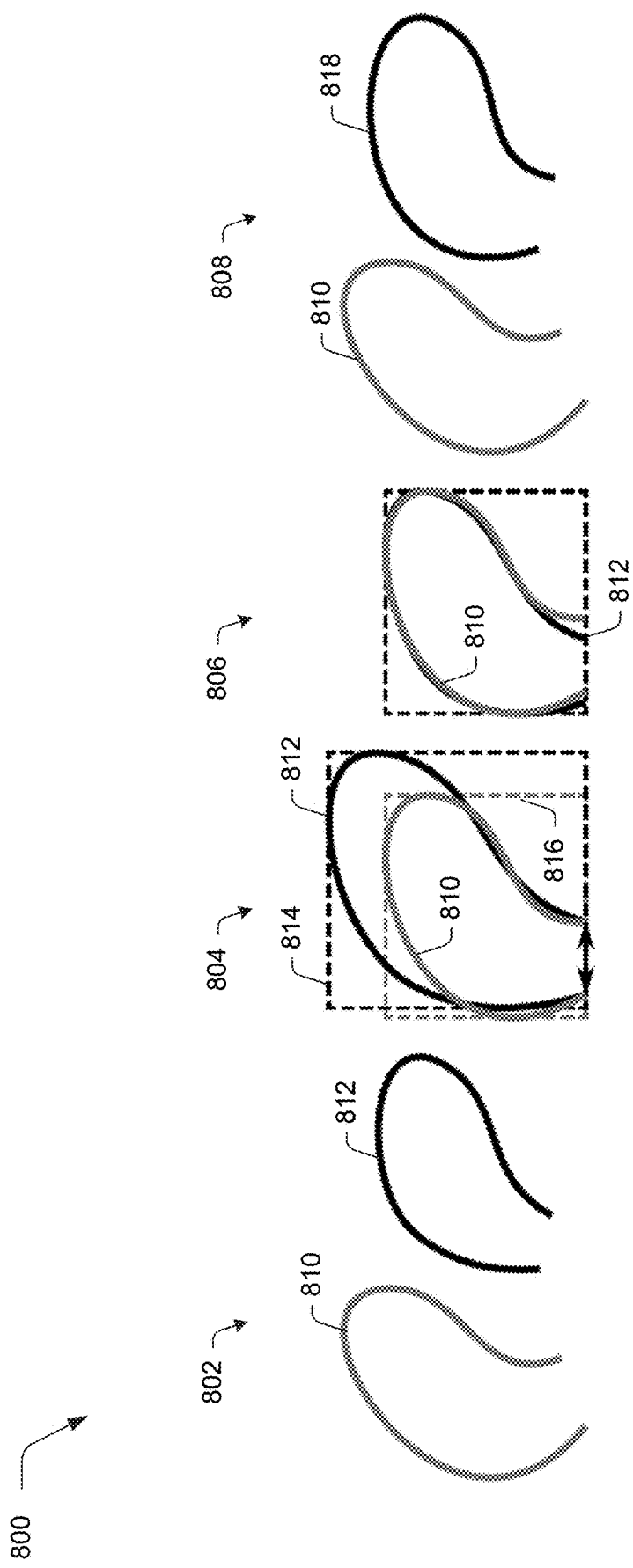
FIG. 8 depicts an example implementation showing adjustment of alignment of two tested paths.

FIG. 8 depicts an example implementation 800 showing adjustment of the alignment of two tested paths through first, second, third, and fourth stages 802, 804, 806, 808. First and second paths 810, 812 are received at the first stage 802. At the second stage 804, the first and second paths 810, 812 are translated and rotated, and universally scaled such that endpoints of the curves match.

At the third stage 806, bounding boxes 814, 816 of the respective first and second paths 810, 812 from the second stage 804 are scaled to match each other, which may be perform non-uniformly. The discrete Frechet distance is computed divided by the length of the tested path to obtain the relative similarity measure. Because the second path 812 (i.e., the "new" path) might be flipped and/or reversed version of the first path 810 (i.e., the "existing" path), four tests are performed between them to determine the correct match.

Thus, for the illustrated example of the first and second paths 810, 812, the endpoints of the paths are matched at the second stage 804 and are then scaled so that the bounding boxes match at the third stage 806. If the second "new" path 812 is then evaluated as being sufficiently similar to the first "existing" path 810, an adjusted path 818 is created as a properly-positioned instance of the first "existing" path 810 to replace the second path as shown at the fourth stage 808. This is but one of a variety of ways to perform path matching.

Offset Path Detection

Offset paths extend the concept of parallelism from line segments to paths. To detect them, a normal line is constructed from each sample of the new path. If the line hits an existing reference path, the distance is measured between the sample point and the closet point on the reference. Note that the distance between the sample point and the line-path intersection is not used, since this would require the user to precisely draw the approximate offset path.

The measured distance is stored along with its sign, i.e., on which side of the new path the hit occurred. The hit information is then sorted according to the distance, creating a cumulative distribution function, and two values corresponding to (50+/−n)-th percentiles, with "n" being twenty-five in an example implementation. By comparing the sign and the distance values of these samples, the likelihood of the new path being an offset path of the reference path is calculated.

Figure 9:
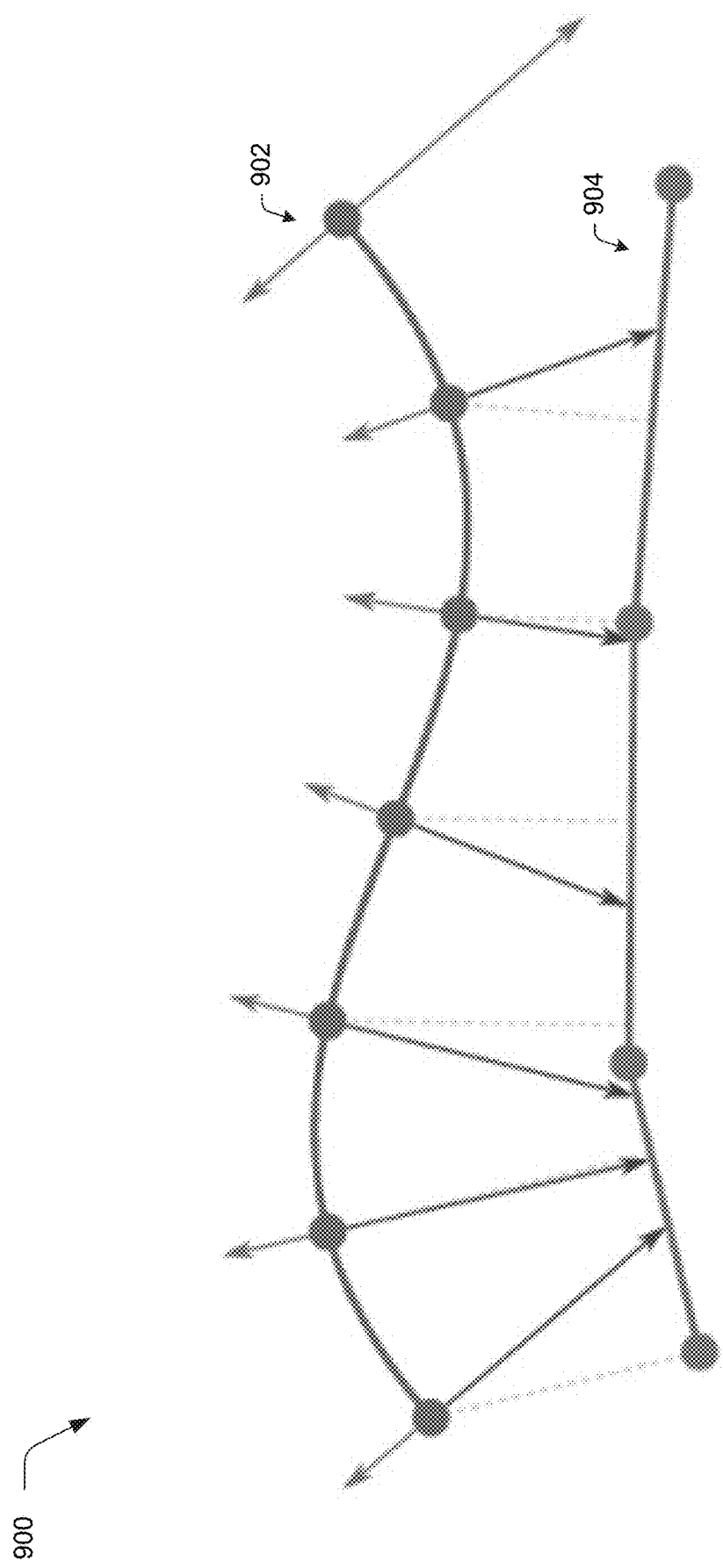
FIG. 9 depicts an example implementation of offset path detection.

FIG. 9 depicts an example implementation 900 of offset path detection. A line is constructed from each point on a sample path 902 in the normal direction. If an existing reference path 904 is hit, the minimal distance from the sample to the reference path is calculated as shown using dashed lines and used in offset-path-likelihood computation.

Figure 10:
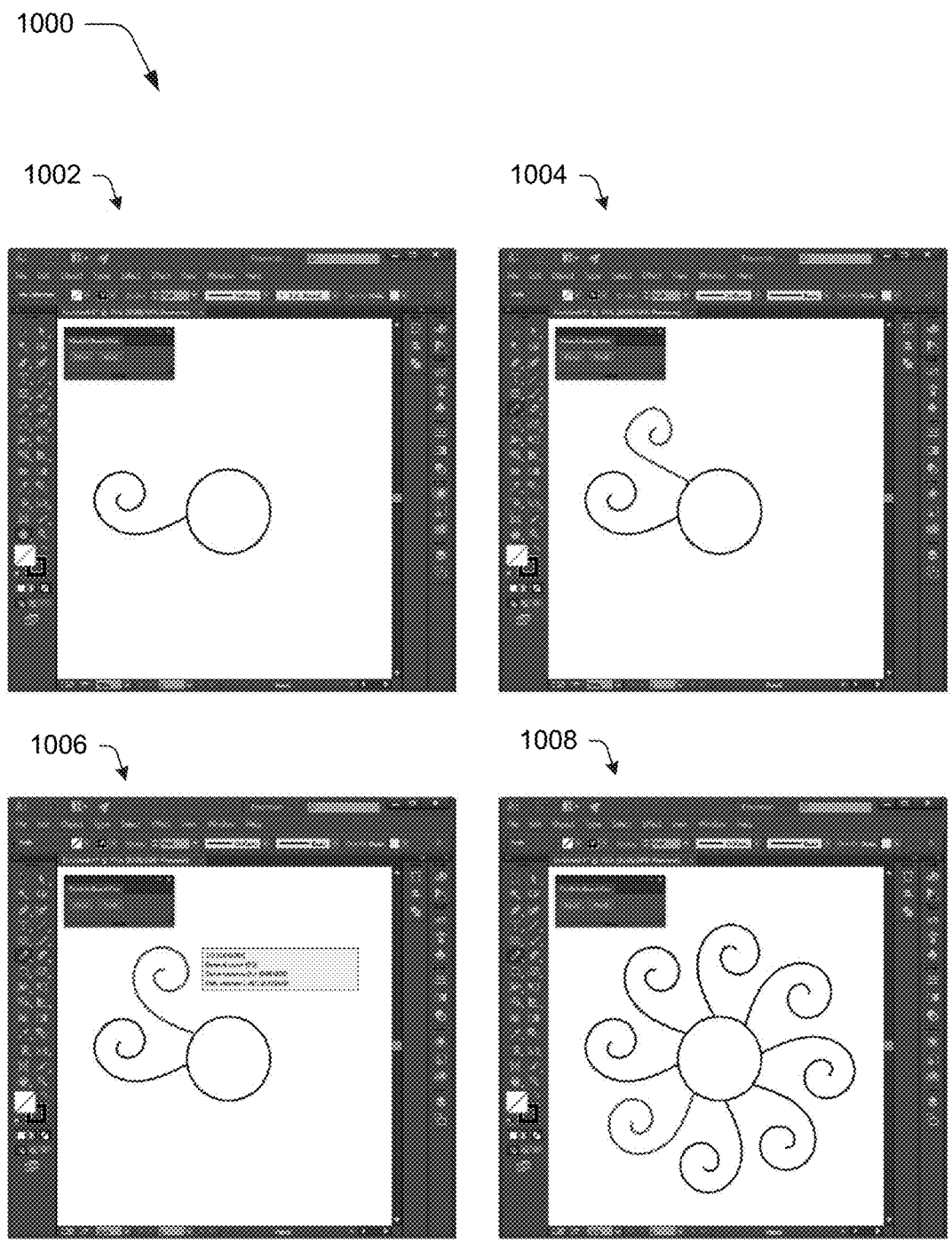
FIG. 10 depicts an example implementation showing a transform again feature.
Figure 11:
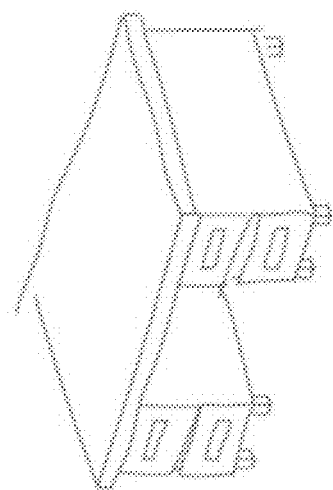
FIGS. 11, 12, 13, and 14 depict respective examples of techniques performed by a beautification assistant module of FIG. 1.
Figure 11:
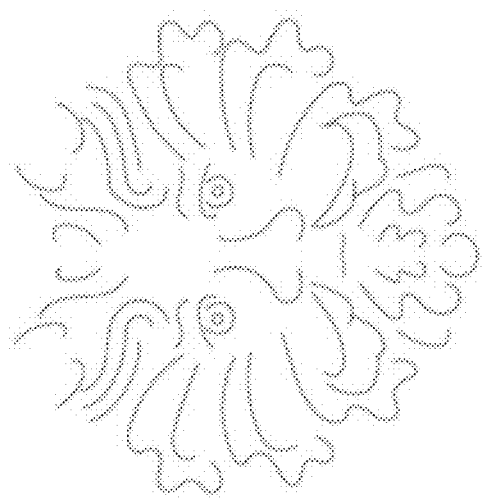
Figure 11:
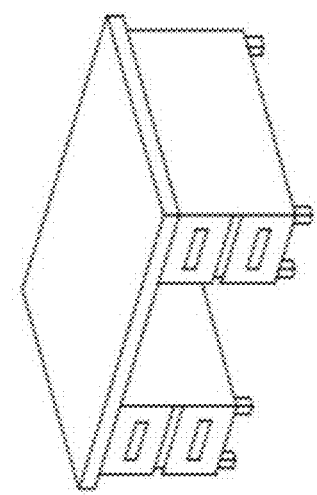
Figure 11:
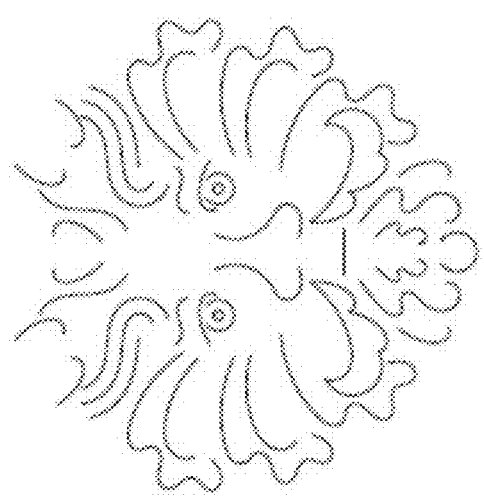
Figure 11:
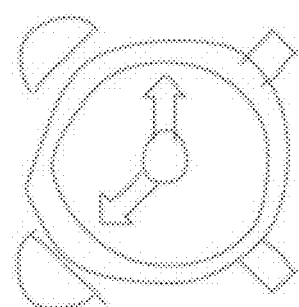
Figure 11:
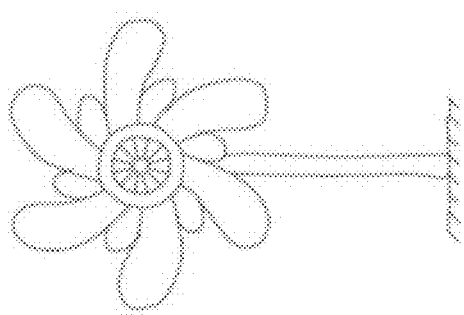
Figure 11:
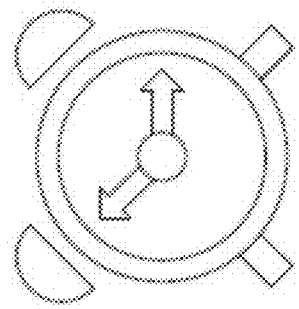
Figure 11:
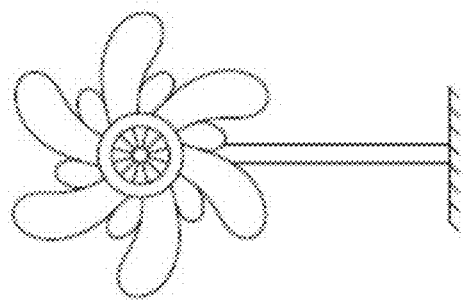
Figure 12:
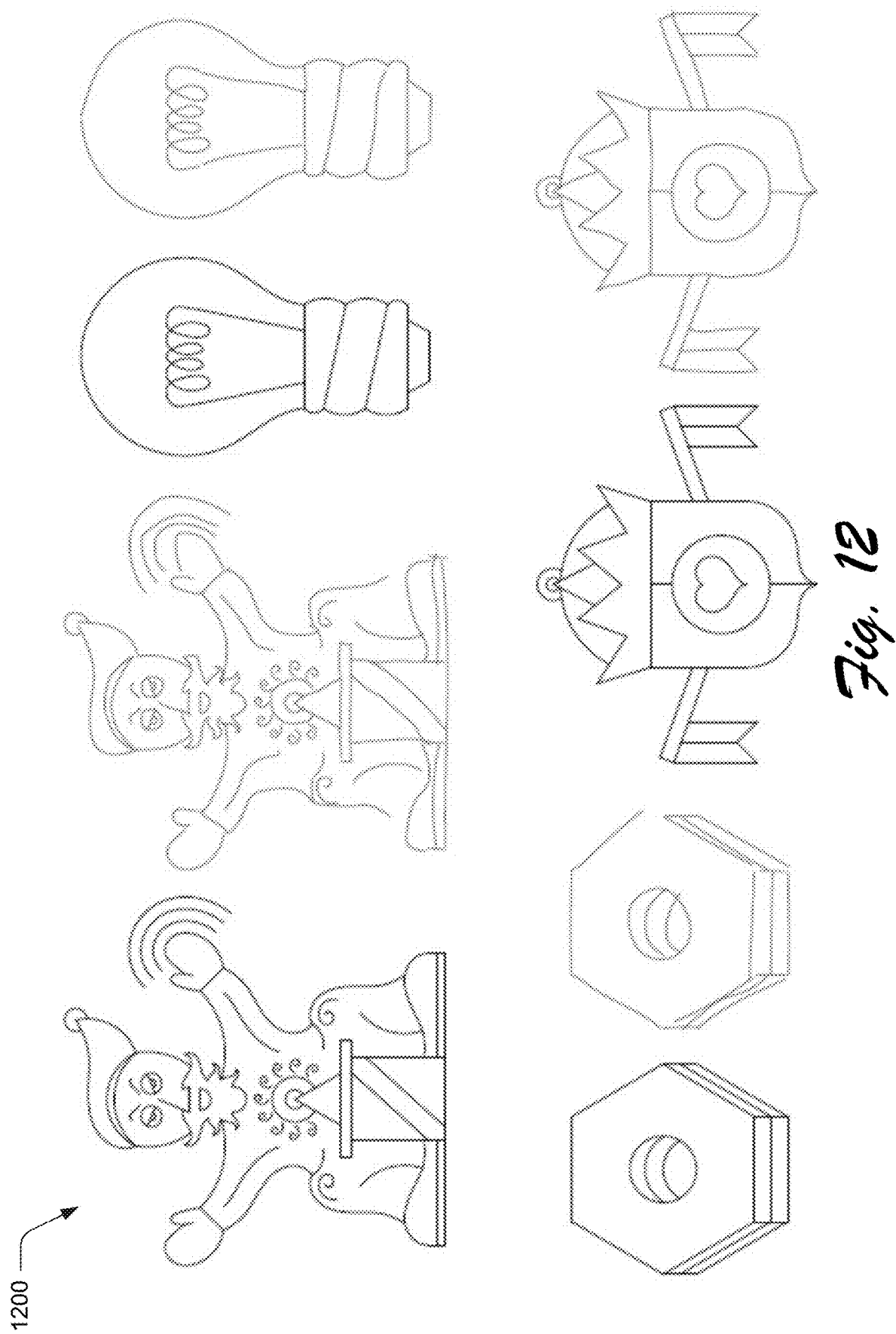
Figure 13:
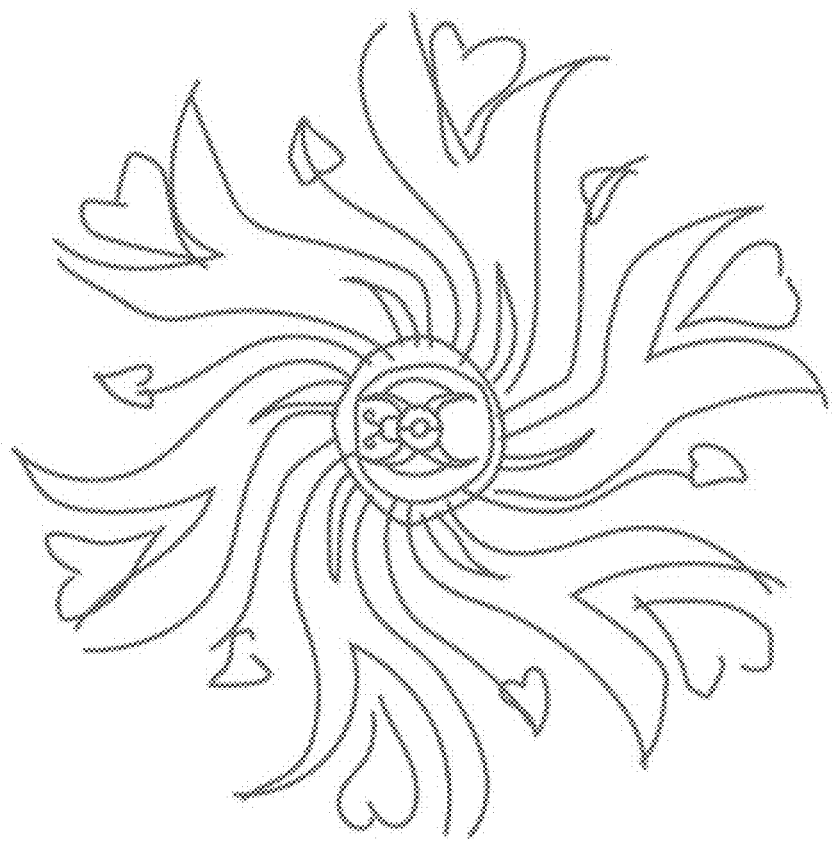
Figure 13:
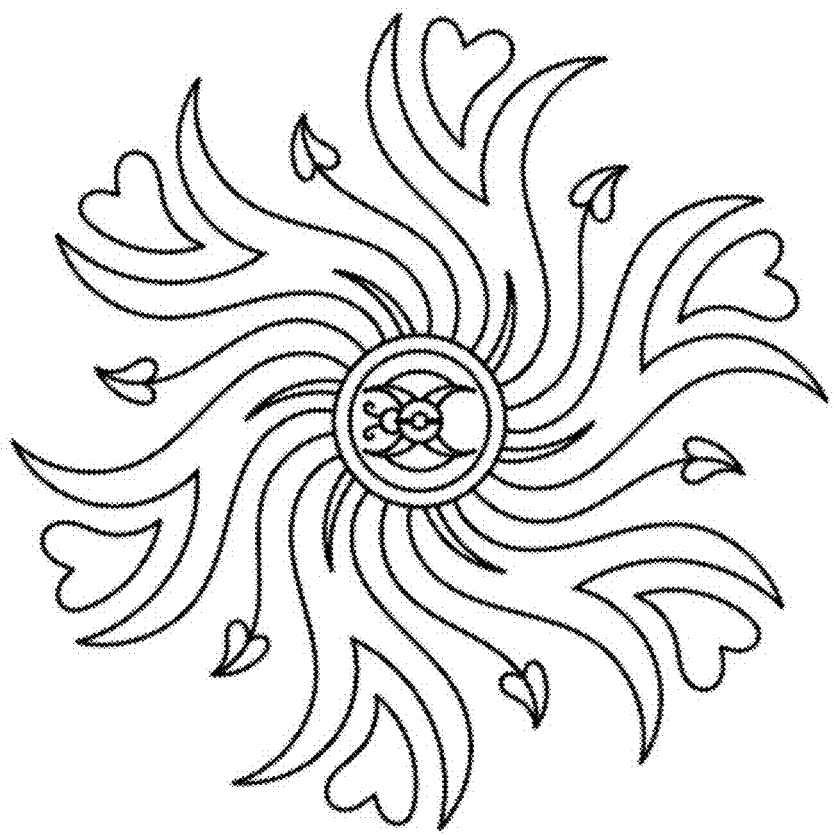
Figure 14:
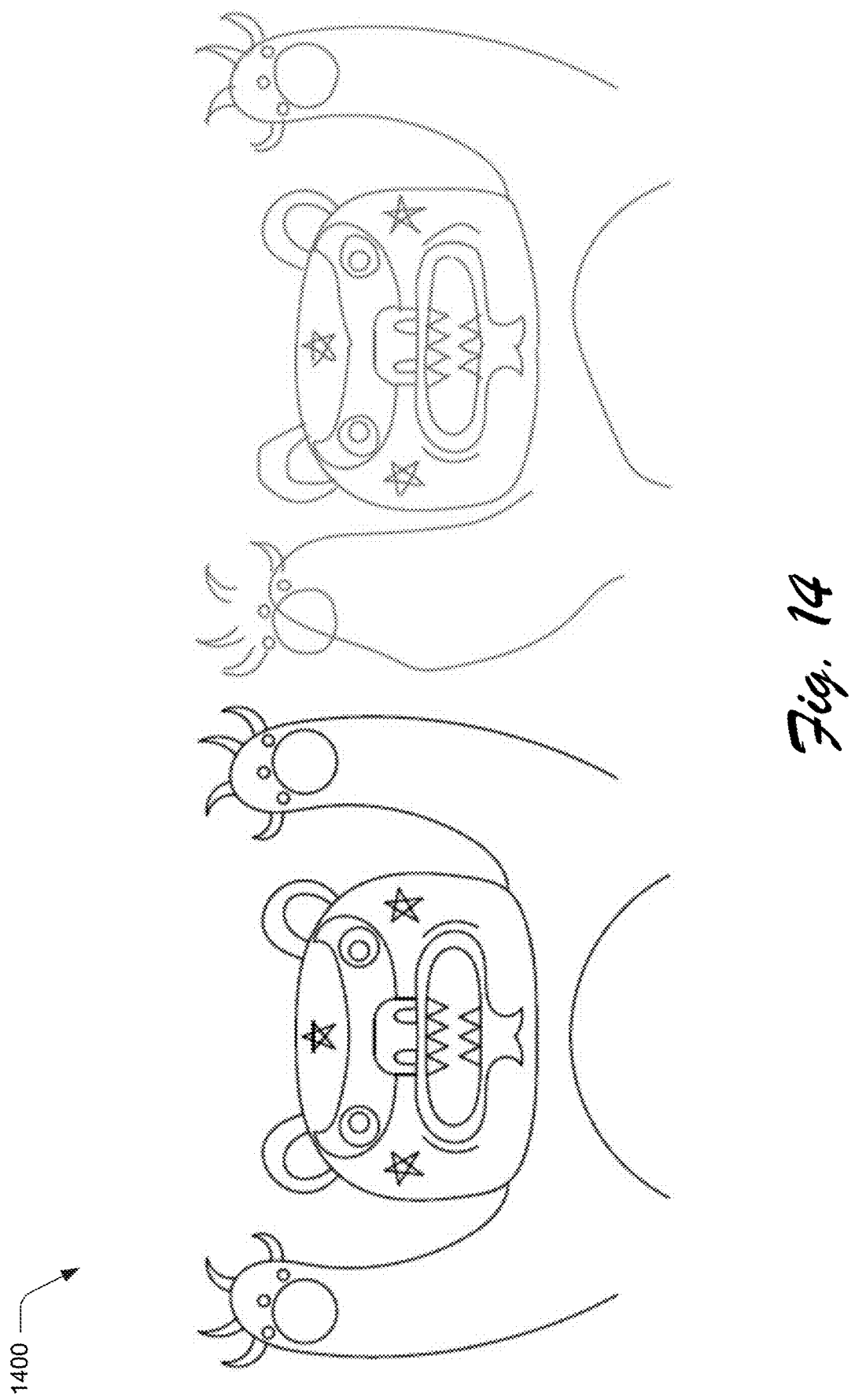

FIG. 10 depicts an example implementation 1000 showing a transform again feature. A path is drawn at 1002 and when a new path 1004 is added to a user interface, it is processed and suggestions are output. If the user chooses a suggestion that is a rotation as shown at 1006, a transform again feature is enabled in which a user can then easily complete the eight-fold rotational symmetry drawing as shown at 1008, e.g., by continued drawing and automatic fitting.

Example Results

FIGS. 11, 12, 13, and 14 depicts respective examples 1100, 1200, 1300, 1400 of techniques performed by the beautification assistant module 108. Side-by-side pairs show the beautified output on the left and the original input strokes on the right. Thus, as described above the beautification assistant module 108 supports beautification of freeform drawings. Since the user input is often imprecise and thus ambiguous, multiple output suggestions may be generated. To this end, the problem is formulated as a search in a rooted tree graph where nodes contain transformed input stroke, edges represent applications of geometric rules and suitable suggestions correspond to different paths from root node to some leaf nodes. To avoid computational complexity of traversal through the whole graph, a best-first search approach is employed where the order of visiting tree nodes is directed by the likelihood of application of the particular geometric rules.

On top of this framework, a system is developed of self-contained rules representing different geometric transformations, which can be extended. Various rules are implemented that can work not only with simple primitives like line segments and circular arcs, but also with general Bezier curves, for which it showed how to detect previously unsupported relations such as curve identity or rotational and reflection symmetry. With the ability to process general curves, these techniques extend the range of applicability of freeform sketching, which was conventionally limited to drawings in specialized, highly-structured applications like forms or technical diagrams. This advantage is further promoted by the widespread adoption of touch-centric devices. Further discussion of these and other examples is contained in the following section.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIG. 1-.

Figure 15:
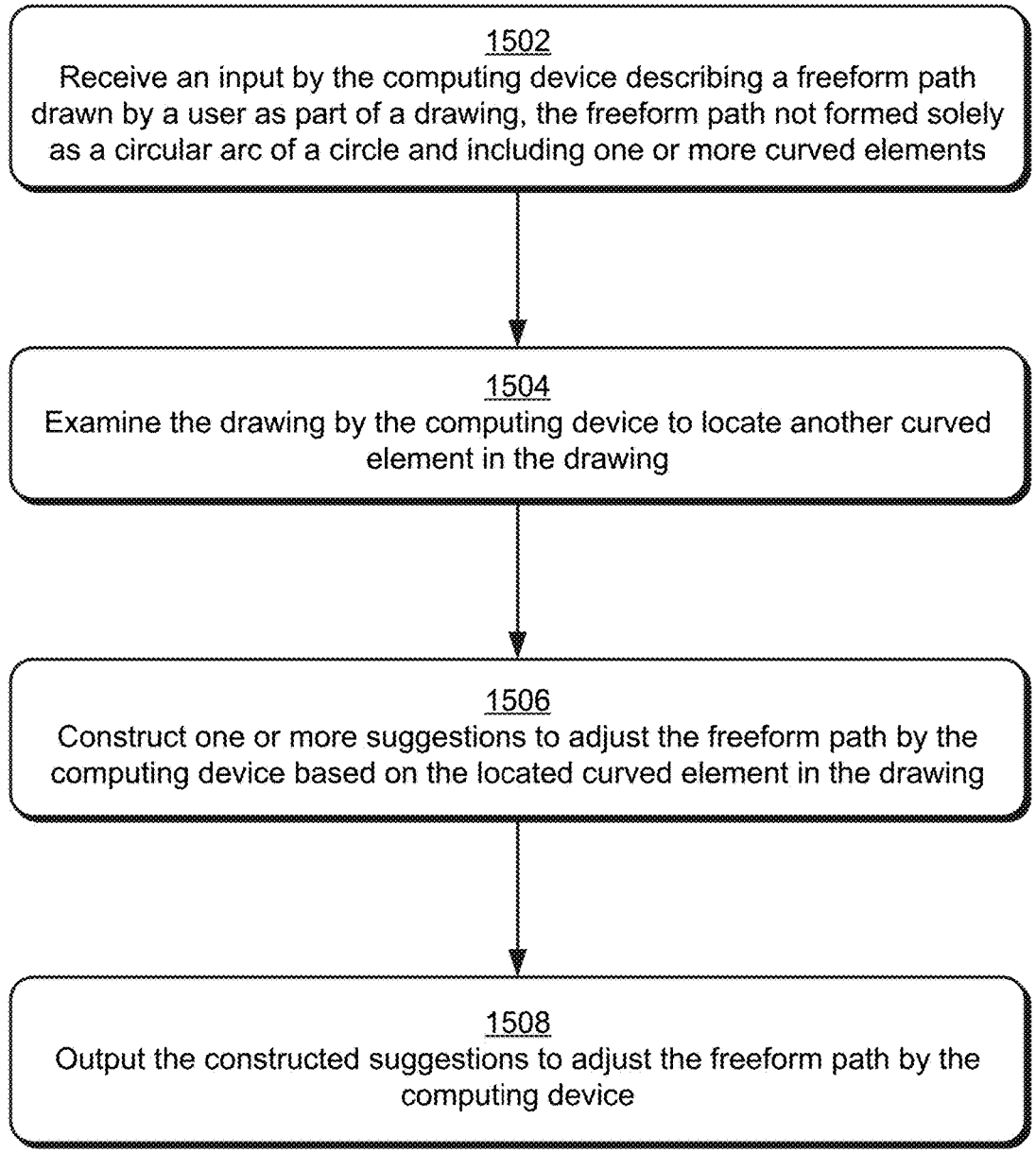
FIG. 15 is a flow diagram depicting a procedure in an example implementation of controlling beautification of freeform drawings by a computing device.

FIG. 15 depicts a procedure 1500 in an example implementation of controlling beautification of freeform drawings by a computing device. An input is received by a computing device describing a freeform path drawn by a user as part of a drawing, the freeform path not formed solely as a circular arc or a circle (e.g., a fixed distance from a point) and including one or more curved elements (block 1502). The input is detectable in a variety of ways by the computing device 102, such as to use touchscreen functionality of the display device 104 (e.g., as a gesture made by a finger of a user's hand or stylus), a trackpad, a cursor control device (e.g., mouse), and so forth.

The drawing is examined by the computing device to locate another curved element in the drawing (block 1504). The beautification assistant module 108, for instance, may examine the drawing to locate previously input freeform paths or other paths that include curved elements.

One or more suggestions are constructed to adjust the freeform path by the computing device based on the located curved element in the drawing (block 1506). The suggestions may be based on a curve offset, curve similarity, and so on as described above. The constructed one or more suggestions are output to adjust the freeform path by the computing device (block 1508). The user may be provided with the suggestions in the user interface that are selectable, the suggestions may be used to automatically adjust the freeform path, and so forth.

Figure 16:
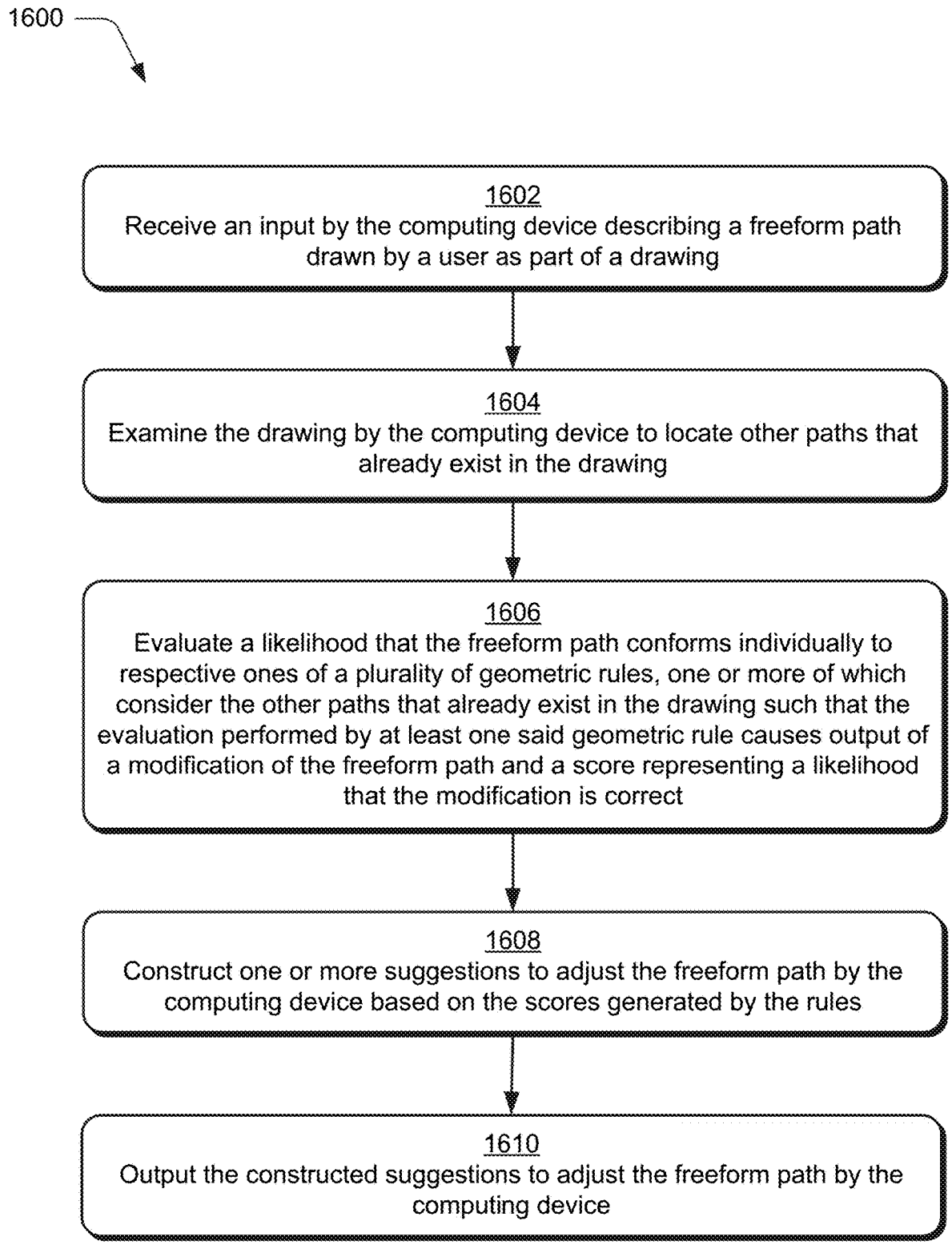
FIG. 16 is a flow diagram depicting another procedure in an example implementation of controlling beautification of freeform drawings by a computing device.

FIG. 16 depicts a procedure 1600 in another example implementation of controlling beautification of freeform drawings by a computing device. An input is received by a computing device describing the freeform path drawn by a user as part of a drawing (block 1602). The drawing is also examined by the computing device to locate other paths that already exist in the drawing (block 1604). A user, for instance, may draw a freeform path 204 (e.g., using a finger, stylus, mouse, and so on) in a drawing that already includes an existing freeform path 202. The computing device may thus output a display of the freeform path and locate other paths that are already drawn, e.g., by the user or otherwise already exist in drawing.

A likelihood is evaluated that the freeform path conforms individually to respective ones of a plurality of geometric rules, one or more of which consider the other paths that already exist in the drawing such that the evaluation performed by at least one of the geometric rules causes output of a modification of the freeform path and a score representing a likelihood that the modification is correct (block 1606) The beautification assistant module 108, for instance, may form a directed graph as shown in FIG. 4 by treating each of a plurality of geometric rules 302, 304 as an extensible set of self-contained geometric rules, each built as a black box and independent of other rules that outputs a score representing the likelihood that the modification is correct. The geometric rules may also be chained to support complex modifications of the input freeform path through successive application of the geometric rules to arrive at modifications and scores for those modifications.

One or more suggestions are constructed to adjust the freeform path by the computing device based on the scores generated by the rules (block 1608). The one or more suggestions, for instance, may be based on the modifications and corresponding score representing the likelihood that the modification is correct. The constructed suggestions are then output to adjust the freeform path by the computing device (block 1610) and as such may act to beautify the paths in the drawing input by a user based on other paths that already exist in the drawing. A variety of other examples are also contemplated as described above.

Example System and Device

Figure 17:
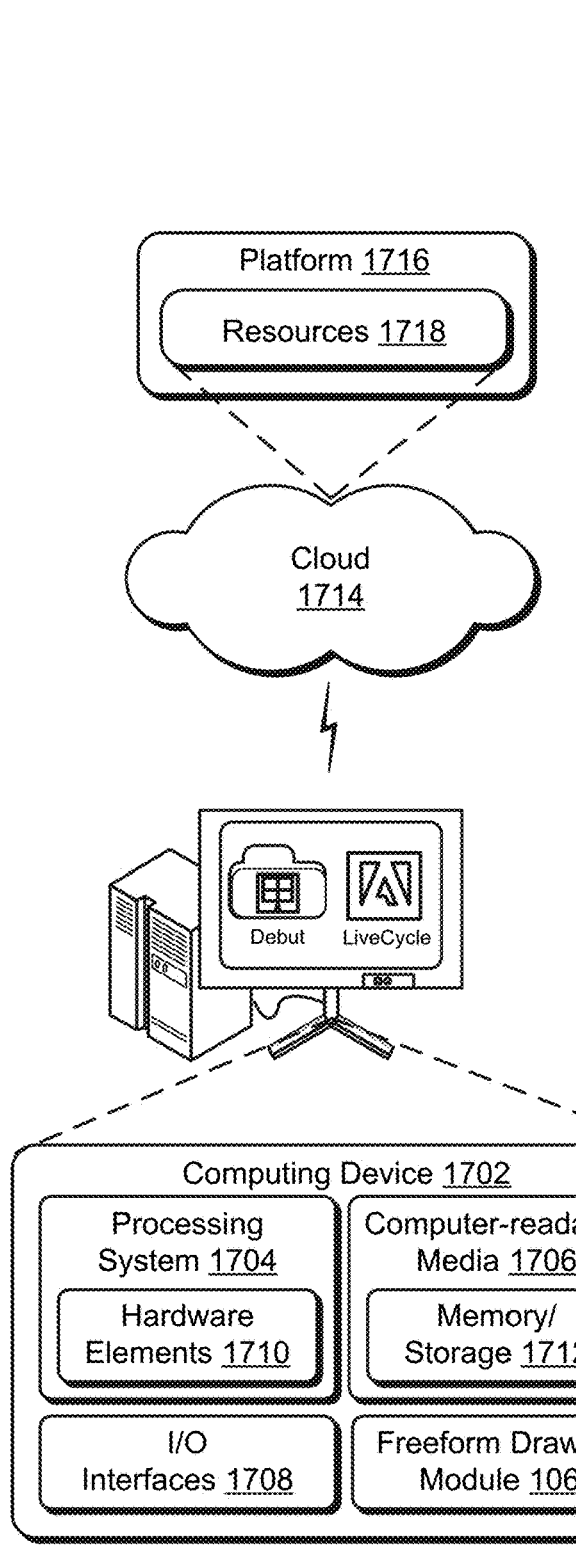
FIG. 17 illustrates an example system including various components of an example device that can be implemented as any type of computing device as described and/or utilize with reference to FIGS. 1-16 to implement embodiments of the techniques described herein.

FIG. 17 illustrates an example system generally at 1700 that includes an example computing device 1702 that is representative of one or more computing systems and/or devices that may implement the various techniques described herein. This is illustrated through inclusion of the freeform drawing module 106. The computing device 1702 may be, for example, a server of a service provider, a device associated with a client (e.g., a client device), an on-chip system, and/or any other suitable computing device or computing system.

The example computing device 1702 as illustrated includes a processing system 1704, one or more computer-readable media 1706, and one or more I/O interface 1708 that are communicatively coupled, one to another. Although not shown, the computing device 1702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1704 is representative of functionality to perform one or more operations using hardware. Accordingly, the processing system 1704 is illustrated as including hardware element 1710 that may be configured as processors, functional blocks, and so forth. This may include implementation in hardware as an application specific integrated circuit or other logic device formed using one or more semiconductors. The hardware elements 1710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1706 is illustrated as including memory/storage 1712. The memory/storage 1712 represents memory/storage capacity associated with one or more computer-readable media. The memory/storage component 1712 may include volatile media (such as random access memory (RAM)) and/or nonvolatile media (such as read only memory (ROM), Flash memory, optical disks, magnetic disks, and so forth). The memory/storage component 1712 may include fixed media (e.g., RAM, ROM, a fixed hard drive, and so on) as well as removable media (e.g., Flash memory, a removable hard drive, an optical disc, and so forth). The computer-readable media 1706 may be configured in a variety of other ways as further described below.

Input/output interface(s) 1708 are representative of functionality to allow a user to enter commands and information to computing device 1702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1710 and computer-readable media 1706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1710. The computing device 1702 may be configured to implement particular instructions and/or functions corresponding to the software and/or hardware modules. Accordingly, implementation of a module that is executable by the computing device 1702 as software may be achieved at least partially in hardware, e.g., through use of computer-readable storage media and/or hardware elements 1710 of the processing system 1704. The instructions and/or functions may be executable/operable by one or more articles of manufacture (for example, one or more computing devices 1702 and/or processing systems 1704) to implement techniques, modules, and examples described herein.

The techniques described herein may be supported by various configurations of the computing device 1702 and are not limited to the specific examples of the techniques described herein. This functionality may also be implemented all or in part through use of a distributed system, such as over a "cloud" 1714 via a platform 1716 as described below.

The cloud 1714 includes and/or is representative of a platform 1716 for resources 1718. The platform 1716 abstracts underlying functionality of hardware (e.g., servers) and software resources of the cloud 1714. The resources 1718 may include applications and/or data that can be utilized while computer processing is executed on servers that are remote from the computing device 1702. Resources 1718 can also include services provided over the Internet and/or through a subscriber network, such as a cellular or Wi-Fi network.

The platform 1716 may abstract resources and functions to connect the computing device 1702 with other computing devices. The platform 1716 may also serve to abstract scaling of resources to provide a corresponding level of scale to encountered demand for the resources 1718 that are implemented via the platform 1716. Accordingly, in an interconnected device embodiment, implementation of functionality described herein may be distributed throughout the system 1700. For example, the functionality may be implemented in part on the computing device 1702 as well as via the platform 1716 that abstracts the functionality of the cloud 1714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method of controlling beautification of a freeform path by at least one computing device, the method comprising:
   receiving, by the at least one computing device, an input describing the freeform path drawn in response to a user input as part of a drawing, the freeform path not formed solely as a circular arc or a circle and including at least one curved element;
   locating, by the at least one computing device, a plurality of existing paths included in the drawing with the freeform path, the freeform path having at least one geometric property similar to the plurality of existing paths in the drawing;
   evaluating, by the at least one computing device, a similarity between the freeform path and the plurality of existing paths in the drawing, the evaluating based, in part, on a geometric rule that corresponds to the at least one geometric property;
   constructing, by the at least one computing device, at least one suggestion based on the geometric rule and aging of an existing path of the plurality of existing paths relative to aging of one or more other existing paths of the plurality of existing paths, the constructing including:
      scaling either the freeform path or the existing path, the scaling causing a distance between endpoints of the freeform path to match a distance between endpoints of the existing path; or
      causing a curvature of a segment of the freeform path to match a curvature of a segment of the existing path; and
   outputting, by the at least one computing device, the constructed at least one suggestion to modify the freeform path.

2. A method as described in claim 1, further comprising constructing another suggestion that causes the freeform path to assume a curve offset in relation to the existing path in the drawing.

3. A method as described in claim 2, wherein the constructing of the other suggestion further includes measuring a distance from the freeform path to the existing path in the drawing and locating portions where the distance is relatively uniform and the other suggestion describes the curve offset.

4. A method as described in claim 1, further comprising constructing another suggestion as a copy of the existing path in the drawing that has been translated, scaled, or rotated.

5. A method as described in claim 1, further comprising constructing another suggestion based on curve similarity of the at least one curved element of the freeform path to the existing path in the drawing.

6. A method as described in claim 5, wherein the curve similarity is determined by scaling and aligning endpoints of the freeform path to the existing path in the drawing, measuring a distance metric between the scaled and align freeform path to the existing path in the drawing, scaling an absolute value of the distance metric by a length of the freeform path, and replacing the freeform path with the existing path in the drawing in response to a determination that the absolute value is within a defined threshold.

7. A method as described in claim 6, wherein the distance metric is a Frechet distance.

8. A method as described in claim 1, wherein screen space in pixels is used for distances in the constructing of the at least one suggestion.

9. A method as described in claim 1, wherein the at least one suggestion is based at least in part on distances between the freeform path and respective ones of the plurality of existing paths.

10. A method as described in claim 1, wherein the method further comprises:
    calculating one or more scores representing a likelihood that the at least one suggestion is correct; and
    outputting the one or more calculated scores.

11. A method as described in claim 10, wherein the one or more scores reflect an amount of adjustment performed to generate the constructed at least one suggestion to modify the freeform path.

12. A method of controlling beautification of a freeform path by at least one computing device, the method comprising:
    receiving, by the at least one computing device, an input describing the freeform path drawn by a user as part of a drawing, the freeform path including at least one curved element;
    evaluating, by the at least one computing device, a likelihood that the freeform path conforms individually to respective ones of a plurality of geometric rules, the evaluating including:
        identifying tangent lines of the curved element at multiple locations along a segment of the freeform path;
        calculating angles between successive tangent lines of the identified tangent lines; and
        determining whether the calculated angles between the successive tangent lines of the freeform path is within an expected range;
    constructing, by the at least one computing device, at least one suggestion to adjust the freeform path by the computing device based, in part, on the determination that the calculated angles between the successive tangent lines of the freeform path are within the expected range, the at least one suggestion having a uniform curvature throughout the segment of the freeform path; and
    outputting, by the at least one computing device, the at least one constructed suggestion to adjust the freeform path such that the curved element is a full circle.

13. A method as described in claim 12, wherein the geometric rules include a threshold to determine whether to output the at least one suggestion to adjust the freeform path.

14. A method as described in claim 12, wherein the plurality of geometric rules are configured to mark properties of the freeform path that have become fixed due to modification and are no longer modifiable by other ones of the plurality of geometric rules.

15. A method as described in claim 12, wherein the evaluating including chaining of at least a portion of the plurality of geometric rules through branching in a directed rooted tree of paths.

16. A method as described in claim 12, wherein the method further comprises:
    calculating one or more scores representing a likelihood that the at least one suggestion is correct; and
    outputting the one or more calculated scores.

17. A method as described in claim 16, wherein the one or more scores reflect an amount of adjustment performed to generate the constructed at least one suggestion to adjust the freeform path.

18. A computing device comprising:
at least one module implemented at least partially in hardware including a processing system and computer-readable storage media, the at least one module configured to perform operations comprising:
  receiving an input by the computing device describing a freeform path drawn in response to a user input as part of a drawing, the freeform path including at least one curved element;
  locating, by the computing device, an existing path in the drawing that includes the freeform path, the freeform path having at least one geometric property similar to the existing path in the drawing;
  evaluating, by the computing device, a path rotational symmetry between the freeform path and the existing path in the drawing, the evaluating including;
    identifying a common center point of a rotational center between the freeform path and the existing path; and
    determining an angle of rotation that minimizes differences between the freeform path and the existing path; and
  constructing, by the computing device, at least one suggestion to adjust the freeform path based on the evaluating causing the freeform path to rotate around the common center point.

19. A computing device as described in claim 18, further comprising constructing another suggestion by measuring a distance from the freeform path to the existing path in the drawing and locating portions where the distance is relatively uniform and in such instances the other suggestion is configured to adjust the curve of the freeform path or the existing path causing the freeform path and the existing path to have a similar shape .

20. A computing device as described in claim 18, wherein the common center point is snapped to an existing point of the drawing.

* * * * *